(12) United States Patent
Kumano

(10) Patent No.: US 7,868,579 B2
(45) Date of Patent: Jan. 11, 2011

(54) MICRO-STEP DRIVING METHOD OF STEPPING MOTOR AND ELECTRICALLY-DRIVEN DEVICE USING STEPPING MOTOR

(75) Inventor: Toshiya Kumano, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 461 days.

(21) Appl. No.: 12/127,894

(22) Filed: May 28, 2008

(65) Prior Publication Data

US 2009/0001920 A1 Jan. 1, 2009

(30) Foreign Application Priority Data

Jun. 28, 2007 (JP) .............................. 2007-170486

(51) Int. Cl.
*H02P 8/00* (2006.01)
*H02P 8/22* (2006.01)

(52) U.S. Cl. ...................................... 318/685; 318/696

(58) Field of Classification Search ................ 318/685, 318/696, 611; 360/78.13; 396/244, 256, 396/260
See application file for complete search history.

(56) References Cited

U.S. PATENT DOCUMENTS

| 4,999,558 | A | * | 3/1991 | Onodera et al. | ............. 318/685 |
| 5,583,620 | A | * | 12/1996 | Miyamoto | ................. 399/208 |
| 5,760,359 | A | * | 6/1998 | Nakano et al. | ............. 318/603 |
| 5,790,971 | A | * | 8/1998 | Hsieh | .......................... 701/99 |
| 5,915,861 | A | | 6/1999 | Wegmann et al. | |
| 6,121,744 | A | * | 9/2000 | Hoda et al. | ................. 318/685 |
| 6,140,793 | A | * | 10/2000 | Carr et al. | ................... 318/696 |
| 6,573,680 | B2 | * | 6/2003 | Sasama | ....................... 318/696 |
| 6,853,162 | B2 | * | 2/2005 | Betts et al. | .................. 318/696 |
| 6,984,956 | B2 | * | 1/2006 | Kang et al. | .................. 318/685 |
| 7,026,781 | B2 | * | 4/2006 | Yamazaki et al. | ........... 318/685 |
| 7,170,254 | B2 | * | 1/2007 | Yamada | ....................... 318/685 |
| 7,688,019 | B2 | * | 3/2010 | Yim | .......................... 318/685 |
| 2003/0141838 | A1 | * | 7/2003 | Kang et al. | ................. 318/696 |

(Continued)

FOREIGN PATENT DOCUMENTS

JP 63-059796 A 3/1988

(Continued)

OTHER PUBLICATIONS

Official communication issued in counterpart Japanese Application No. 2007-170486, mailed on Mar. 3, 2009.

*Primary Examiner*—Walter Benson
*Assistant Examiner*—Eduardo Colon
(74) *Attorney, Agent, or Firm*—Keating & Bennett, LLP

(57) ABSTRACT

In a micro-step drive and driving method of a stepping motor, the stepping motor generates a drive force for movement on a prescribed path of a moving unit provided in an electrically driven device, a standard point and a target point of an operation are set on the path, the stepping motor is rotated such that the moving unit passes through the standard point, a count value of a stable stop point of the stepping motor that is closest to a count value at the point of time when the moving unit passed through the standard point is specified, the specified count value is set as a start point for controlling a rotation angle of the stepping motor, and the stepping motor is rotated, and stopped at the count value of the selected stable stop point.

11 Claims, 5 Drawing Sheets

U.S. PATENT DOCUMENTS

| | | | |
|---|---|---|---|
| 2003/0189611 A1* | 10/2003 | Fan et al. | 347/19 |
| 2005/0116678 A1* | 6/2005 | Yamada | 318/685 |
| 2005/0218857 A1* | 10/2005 | Yamazaki et al. | 318/685 |

FOREIGN PATENT DOCUMENTS

| | | |
|---|---|---|
| JP | 09-247997 A | 9/1997 |
| JP | 10-164893 A | 6/1998 |
| JP | 10-174493 A | 6/1998 |
| JP | 2001-275398 A | 5/2001 |

\* cited by examiner

MICRO-STEP DRIVING METHOD OF STEPPING MOTOR AND ELECTRICALLY-DRIVEN DEVICE USING STEPPING MOTOR

CROSS-REFERENCE TO RELATED APPLICATIONS

This application claims priority under 35 U.S.C 119 to Japanese Patent Application No. 2007-170486, filed on Jun. 28, 2007, which application is hereby incorporated by reference in its entirety.

BACKGROUND OF THE INVENTION

1. Field of the Invention

The present invention relates to a micro-step driving method of a stepping motor that controls a rotation angle by counting pulses of current, and relates to an electrically driven device in which a moving member is moved in accordance with a prescribed path by a stepping motor driven by micro-stepping.

2. Description of the Related Art

Conventionally, a stepping motor has been widely used as a drive source of various electrically driven devices. A micro-step driving technique is known for smoothly rotating such stepping motors. When the stepping motor of the electrically driven device is controlled by being rotated or stopped, the stepping motor structurally has a position to stably stop at. For example, in the case of a stepping motor using two-phase drive, a two-phase position of a rotor is a stable stop point. In the micro-step drive, when the motor is controlled by having the stable stop point as a start point, the electrically driven device can be accurately controlled.

As described above, in the micro-step drive of the stepping motor, the electrically driven device can be accurately controlled by controlling the motor by having the stable stop point as the start point. However, when the motor is controlled by having an intermediate step position, which is not the stable stop position defined by the start point, the motor is stopped at the unstable intermediate step position, and displacement occurs in a rotation angle of the rotor. Moreover, problems occur because as the positional differences and displacement accumulate, accuracy will be lost. Such problems may occur, for example, when the motor is controlled by having as the start point, a count value at the time when a carriage is positioned at a home position by a flatbed scanner.

SUMMARY OF THE INVENTION

In order to overcome such problems described above, in a configuration including a moving unit and a stepping motor that drives the moving unit, preferred embodiments of the present invention prevent the occurrence of position displacement of the moving unit even when the stepping motor is repeatedly rotated and stopped.

According to a preferred embodiment of the present invention, a stepping motor generates a drive force for movement along a prescribed path of a moving unit provided in an electrically driven device. A standard point and a target point of an operation are set on the path. The stepping motor is rotated such that the moving unit passes through the standard point. A count value of a stable stop point of the stepping motor that is closest to a count value at the point of time when the moving unit passes through the standard point is specified. The specified count value is set as a start point for controlling a rotation angle of the stepping motor. Then, the stepping motor is rotated, and stopped at the count value of the selected stable stop point. Thus, position displacement of the moving unit can be prevented.

According to a preferred embodiment of the present invention, there are provided the moving unit arranged to move in accordance with the prescribed path and the stepping motor arranged to generate the drive force for the movement of the moving unit. The standard point and the target point of the operation are set on the path. Moreover, there are provided a detecting unit arranged to detect that the moving unit has passed through the standard point by being driven, and a control unit arranged to count pulses of current of the stepping motor and control the rotation of the stepping motor. The control unit rotates the stepping motor such that the moving unit passes through the standard point. The count value of the stable stop point of the stepping motor that is closest to the count value at the point of time when the moving unit passed through the standard point is specified. After the specified count value is set as the start point in order to control the rotation angle of the stepping motor, the stepping motor is rotated, and stopped at the selected stable stop point. By executing the above-described processes, position displacement of the moving unit is prevented.

According to a preferred embodiment of the present invention, the count value of the stable stop point of the stepping motor that is closest to the count value at the point of time when the moving unit passed through the standard point is specified and set as the start point for controlling the rotation angle of the stepping motor. Then, the stepping motor is controlled such that the stepping motor is rotated, and stopped at the count value of the selected stable stop point. Accordingly, while the motor is being stopped, sufficient detent torque is generated. Therefore, position displacement of the moving unit does not occur, and the stepping motor can be accurately driven. The prescribed path includes not only a straight path but also any curved path such as a circle path.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
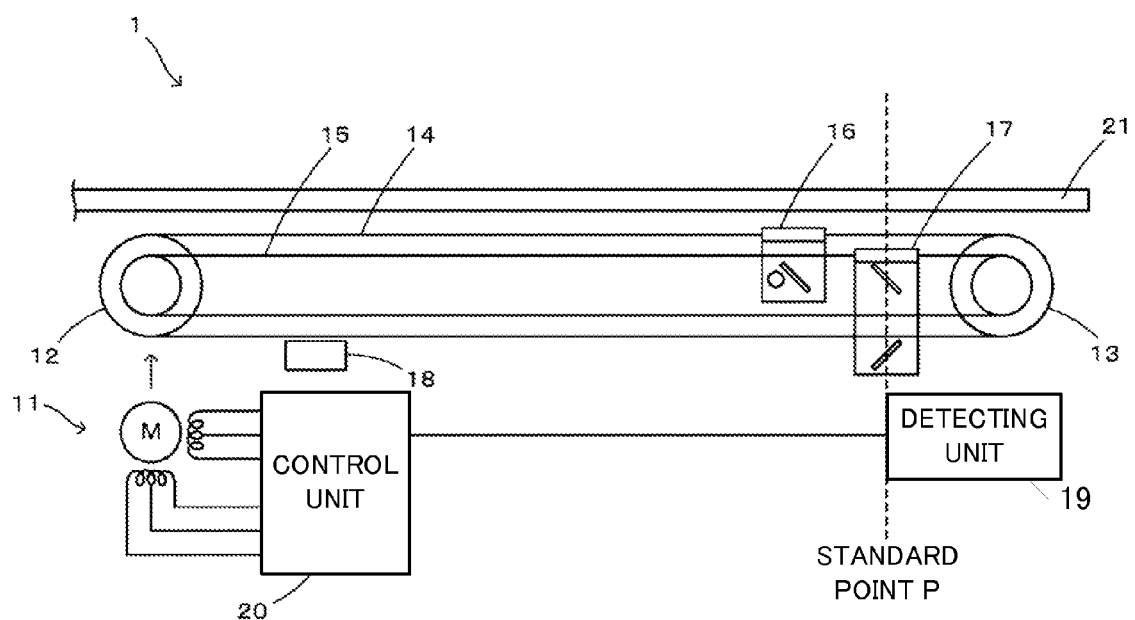
FIG. 1 is a sectional view of a mechanical portion of a scanner device according to a preferred embodiment of the present invention.

With reference to the drawings, a scanner device will be described as a specific example of an electrically driven device applying preferred embodiments of the present invention. FIG. 1 is a schematic sectional view of a mechanical portion of a flatbed scanner device 1 according to a preferred embodiment of the present invention. In the drawing, a stepping motor 11, a double driving pulley 12 rotated by the stepping motor 11, a double pulley 13 preferably having the same or substantially the same radius as the double driving pulley 12, belts 14 and 15 arranged between the double driving pulley 12 and the double pulley 13, a full rate carriage 16 fixed to the belt 14, a half rate carriage 17 fixed to the belt 15, an image pick-up device 18, a detecting unit 19 arranged to detect that the half rate carriage 17 has passed through a standard point P, a control unit arranged to control rotation of the stepping motor 11, and a document (platen) glass 21, are illustrated as components according to the present preferred embodiment of the present invention.

The full rate carriage 16, the half rate carriage 17, and the image pick-up device 18 preferably define an optical system that scans an original document placed on the document glass 21. In particular, the full rate carriage 16 and the half rate carriage 17 preferably define a moving unit that is moved by the rotation of the stepping motor 11. More specifically, the full rate carriage 16 is provided with a light source including a light emitting diode (LED), etc., that irradiates light in a direction of the document glass 21, and with a mirror that reflects the reflected light from the original document towards the half rate carriage 17. The full rate carriage 16 and the half rate carriage 17 are provided with a mirror that further reflects the reflected light from the full rate carriage 16 towards the image pick-up device 18. The image pick-up device 18 is provided, for example, with a Charge Coupled Device (CCD) line sensor unit, etc., that forms an image from the light reflected by the half rate carriage 17.

The full rate carriage 16 is driven in accordance with the belt 14 arranged on a side of an outer ring of the double driving pulley 12 rotated by the stepping motor 11. The half rate carriage 17 is driven in accordance with the drive belt 15 arranged on a side of an inner ring of the double driving pulley 12. The full rate carriage 16 and the half rate carriage 17 are moved in conjunction with each other horizontally along the document glass preferably at a speed ratio of 2:1. By the above system, regardless of the position of the full rate carriage 16 and the half rate carriage 17, a light path length between the original document and the image pick-up device 18 can be maintained constant.

The types of the stepping motor 11 (permanent magnet type, variable reluctance type, or hybrid type, for example) and a number of phases are not limited. For example, half stepping drive, full step drive or the like can be adopted as a driving method. Hereinafter, an example will be described in which a unipolar stepping motor is used for the full step drive.

The detecting unit 19 includes an optical or mechanical sensor that outputs a detection signal when the half rate carriage 17 is on a right side of the standard point P in the drawing. The standard point P corresponds to a position at which the full rate carriage 16 starts scanning the original document properly placed on the document glass 21.

The control unit 20 receives the detection signal output from the detecting unit 19, and controls a rotation angle of the stepping motor 11 so as to move the full rate carriage 16 and the half rate carriage 17. In this case, the full rate carriage 16 and the half rate carriage 17, which are the moving unit, are horizontally moved back and forth in accordance with a straight path by the belts 14, 15. Since the rotation angle of the stepping motor 11 at the time when control current is applied is determined, the total rotation angle of the stepping motor can be obtained by counting waveform steps of the control current. A relationship between a travel distance of the full rate carriage 16 and the half rate carriage 17 and the rotation angle of the stepping motor 11 is predetermined by design. The standard point P is a start point of an operation of the mirror carriage 17. When a size of the original document is set, a target point can be automatically set in accordance with the set size. In this preferred embodiment, the path on which the moving unit is moved preferably is a straight path, for example. However, the ideas, concepts and features of preferred embodiments of the present invention can be applied to any curved path such as a circle path.

In a preferred embodiment of the present invention, the stepping motor 11 is preferably driven by micro-stepping. By changing current ratio of two windings by slow degrees, the stepping motor 11 is rotated by a lower (smaller) rotation angle, not by a rotation angle corresponding to a pulse of conventional control current. A division number of the micro-steps is not limited, and for example, the half stepping drive may be divided by two, or the full step drive may be divided by four, or the like.

Figure 2:
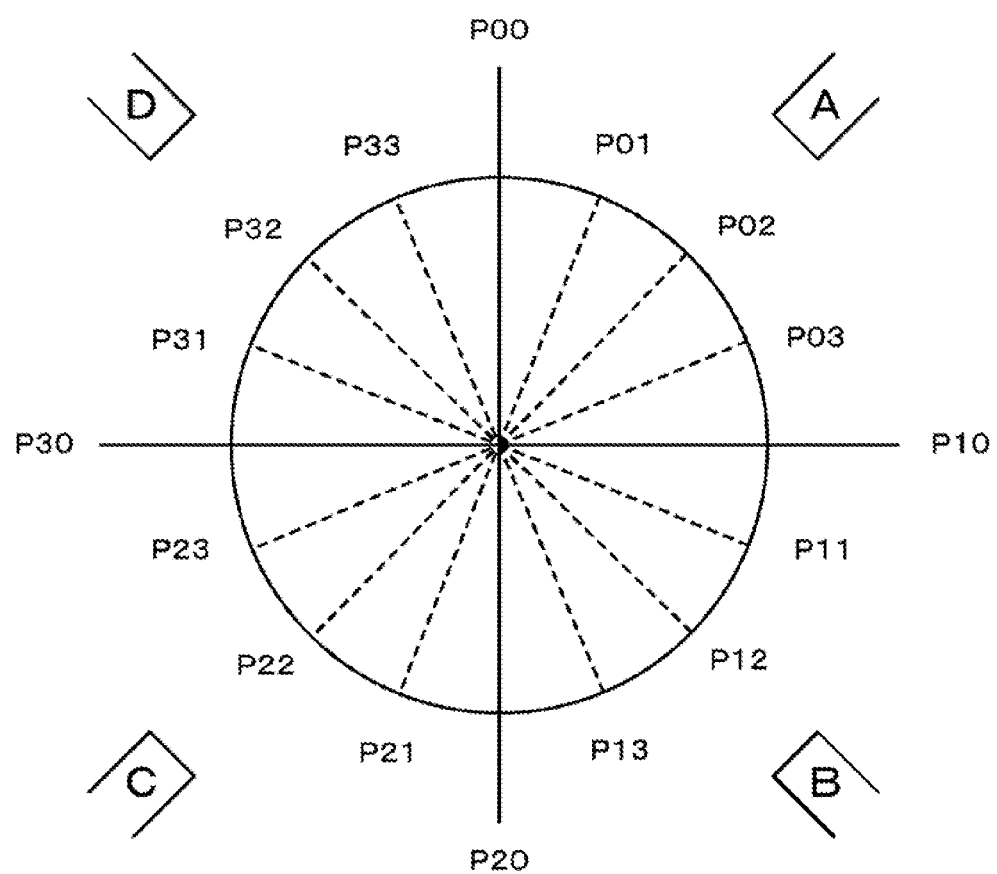
FIG. 2 is an explanatory diagram of micro-step drive for explaining a stable stop point.

FIG. 2 is an example of micro-step drive in which the full step drive is preferably divided by four. In the basic control of the full step drive, two windings, for example, a combination of a windings D and A, a combination of windings A and B, a combination of windings B and C, and a combination of windings C and D, are sequentially selected, and the control current is simultaneously applied to the selected two windings. A magnetic pole of a rotor is always attracted by the two windings. In this example, there are provided the windings A, B, C, D, and points P00, P10, P20, P30 are stable stop points arranged between the windings D and A, A and B, B and C, and C and D, respectively. The stepping motor 11 is controlled by the rotation angle of 90 degrees, which is an angle between a certain stable stop point and the next stable stop point. However, in the micro-step drive, each phase of the control current is controlled preferably by being divided into four levels by sine cosine micro-stepping. That is, the stepping motor 11 preferably is rotated by about 22.5 degrees, for example, which is an angle obtained by dividing 90 degrees by four. In this case, points P01, P02, P03, etc., are merely dynamic midpoints. Therefore, when the rotation is stopped at the midpoint, sufficient detent torque cannot be obtained. Accordingly, in a preferred embodiment of the present invention, the rotation is stopped at the stable stop point by using a method described below.

Figure 3:
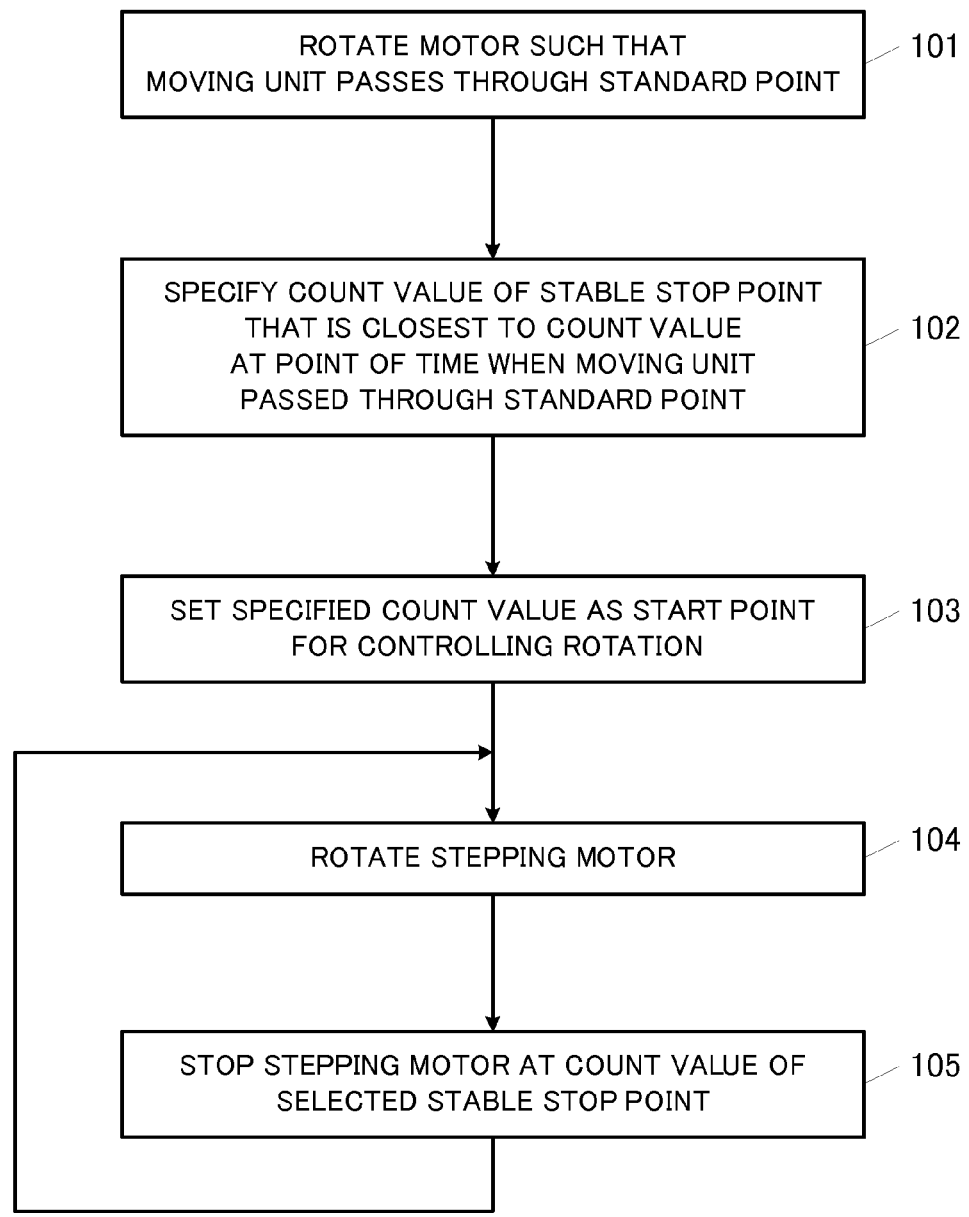
FIG. 3 is a flowchart of a basic operation according to a preferred embodiment of the present invention.

FIG. 3 is a flowchart for explaining a basic procedure according to a preferred embodiment of the present invention. Hereinafter, the procedure will be explained in detail as an example of an operation in which the full rate carriage 16 and the half rate carriage 17 are moved from the standard point P towards the left, that is, as an example of a scanning operation. The following description is based on the assumption that the half rate carriage 17, which is the moving unit, is positioned on the right side of the standard point P before the control is started. Whether the half rate carriage 17 is on the right side or the left side of the standard point P can be determined by the signal of the detecting unit. Accordingly, when the half rate carriage 17 is on the left side, the stepping motor 11 is rotated first to move the half rate carriage 17 to the right side of the standard point P.

When it is detected by the detection signal of the detecting unit 19 that the half rate carriage 17 is on the right side of the standard point P, while counting waveform steps (microsteps) of the current, the control unit 20 rotates the stepping motor 11 by controlling the motor 11 in phases such that the half rate carriage 17 is moved towards the left to pass through the standard point P. In the example of FIG. 2, while a count value is counted from 0, 1, 2, 3, 4 . . . , the stepping motor 11 is rotated by the rotation angle of P00, P01, P02, P03, P10 . . . . . When first energized, the stepping motor 11 is independently rotated to be positioned at the stable stop point. Therefore, the count value "0" corresponds to the stable stop point (step 101).

Next, the count value of the stable stop point that is closest to the count value at the time when the half rate carriage 17 passed through the standard point P is specified. More specifically, when the count value at the time when the carriage 17 passed through the standard point P is "21", the count value "20" of the stable stop point P10, which is closest to the count value "21", is specified (step 102). Subsequently, the specified count value is set as a start point for controlling the rotation angle of the stepping motor 11 (step 103).

Then, an operation in which the stepping motor 11 is rotated, and stopped at the count value of the selected stable stop point is properly repeated. More specifically, the count value "20" is set as the start point for controlling the rotation angle. Accordingly, while counting the waveform steps of the current, the stepping motor 11 is rotated, any count value that is obtained by adding multiple of four to the count value "20" or by subtracting multiple of four from the count value "20", in other words, any count value "24", "28", "32" . . . , etc. is selected, and the motor is controlled to be stopped at the selected count value (steps 104 and 105). More generally, any integral multiple of "n" ("n": natural number), that is, any of "2n", "3n", "4n" . . . is selected to stop the stepping motor 11.

Such control is especially effective when, in the scanner device 1 for example, the scanning operation has to be stopped along the way as an image memory becomes exhausted or the like. In such cases, before the image memory becomes exhausted, an interruption signal notifying such exhaustion is input into the control unit 20. Then, based on the current count value, the control unit 20 selects the count value of the closest stable stop point to be reached at, and stops the rotation of the stepping motor 11 at the selected count value. For example, in the example of FIG. 2, when the count value is "201", the count value "204" is selected for stopping the motor 11. In order to maintain the stepping motor 11 under suspension, the current at the time when the motor 11 was stopped may be continuously applied. Thus, since the rotor of the stepping motor 11 can be maintained by sufficient detent torque, while being under suspension or when the rotation is restarted, displacement in the rotation angle of the rotor will not occur.

Figure 4:
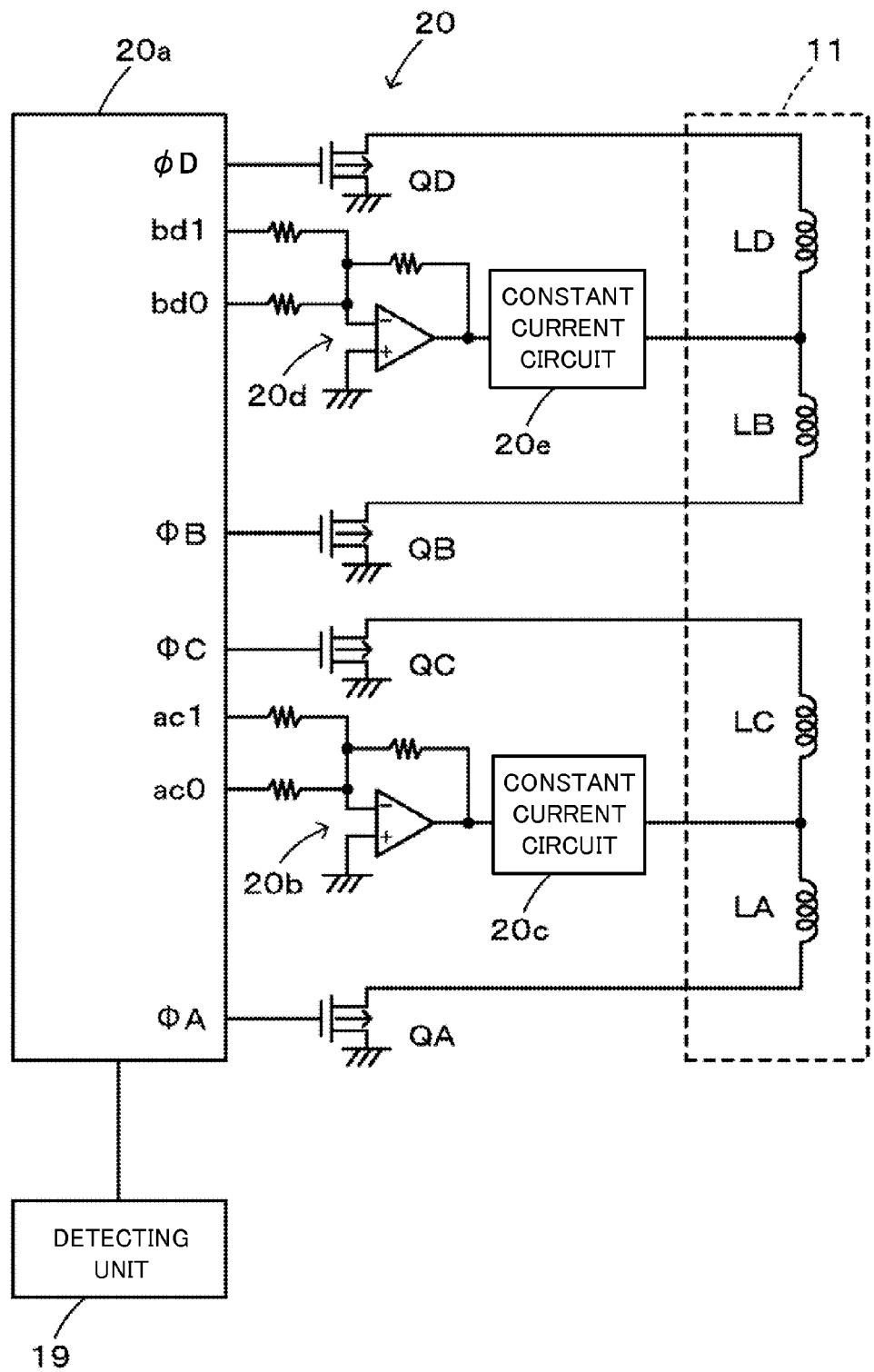
FIG. 4 is a schematic circuit diagram of a control unit.

FIG. 4 is a schematic circuit diagram for explaining a specific example of the control unit 20, which controls the full-step-drive stepping motor 11. The control unit 20 includes a microcomputer 20a, etc., for example, and outputs necessary pulse φA, φB, φC, φD, ac0, ac1, bd0, bd1 from a port of the microcomputer 20a. An analog adder circuit 20b that includes an operational amplifier and resistance outputs the pulses ac0 and ac1 as a weighted sum. For example, the adder circuit 20b outputs "ac0+2×ac1" as a voltage level. The voltage level output here is 0, −V, −2V, or −3V (V is set based on a resistance value). A constant current circuit 20c outputs current proportional to the above voltage level. In accordance with the pulses φA and φC, active elements QA and QC controls to turn on or off the current flowing from the constant current circuit 20c to windings LA and LC.

Similarly, an analog adder circuit 20d outputs "bd0+2×bd1" as a voltage level. A constant current circuit 20e outputs current proportional to the voltage level. In accordance with the pulses φB and φD, active elements QB and QD control to turn on or off the current flowing from the constant current circuit 20e to windings LB and LD. The analog adder circuits 20b and 20d may be configured with a resistor ladder circuit.

Figure 5:
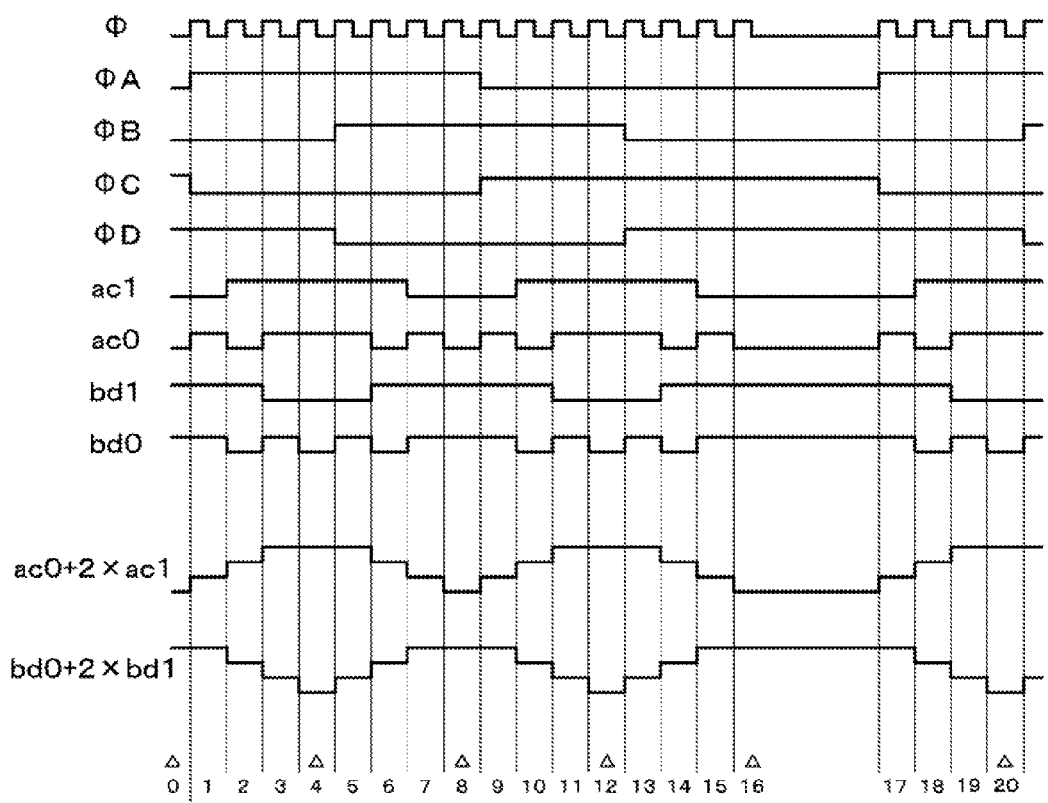
FIG. 5 is a time chart of an operation of the control unit.

FIG. 5 is a waveform diagram for explaining the operation of the control unit 20. FIG. 5 illustrates clock φ corresponding to the micro-stepping, the pulses φA, φB, φC, φD, ac0, ac1, bd0, bd1 output by the microcomputer 20a, and the added voltage levels "ac0+2×ac", and "bd0+2×bd1". The numbers 0 through 20 denote the count values, and a mark Δ denotes the stable stop point. The pulses φA, φB, φC, φD are basic pulses of full step drive.

The control unit 20 rotates the stepping motor 11 from the count value "0". When the count value at the time when the half rate carriage 17 passes through the standard point P is "3", the count value "4" of the stable stop point, which is closest to the count value "3", is specified and set as the start point for controlling the rotation angle of the rotor of the stepping motor 11. Then, the control unit 20 controls to stop the rotation, for example, at the count value "16" or the like, which is obtained by adding multiple of four to the count value "4".

While the present invention has been described with respect to preferred embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. A micro-step driving method of a stepping motor, comprising the steps of:
    generating, by a stepping motor, a drive force for movement on a prescribed path of a moving unit provided in an electrically driven device;
    setting a standard point and a target point of an operation on the path and rotating the stepping motor such that the moving unit passes through the standard point;
    specifying a count value of a stable stop point of the stepping motor that is closest to a count value at the point of time when the moving unit passes through the standard point;
    setting the specified count value as a start point for controlling a rotation angle of the stepping motor; and
    rotating the stepping motor and then stopping the stepping motor at the count value of the selected stable stop point.

2. The micro-step driving method of the stepping motor according to claim 1, wherein the stepping motor is a two-phase stepping motor.

3. The micro-step driving method of the stepping motor according to claim 1, wherein one step is divided by "n" in micro-stepping, and a position of a count value that is multiple of "n" is set as the start point.

4. An electrically driven device including a stepping motor, comprising:
    means for generating, by a stepping motor, a drive force for movement on a prescribed path of a moving unit provided in the electrically driven device;
    means for setting a standard point and a target point of an operation on the path, and rotating the stepping motor such that the moving unit passes through the standard point;
    means for specifying a count value of a stable stop point of the stepping motor that is closest to a count value of the point of time when the moving unit passes through the standard point;
    means for setting the specified count value as a start point for controlling a rotation angle of the stepping motor; and
    means for rotating the stepping motor and then stopping the stepping motor at the count value of the selected stable stop point.

5. The electrically driven device including the stepping motor according to claim 4, wherein the stepping motor is a two-phase stepping motor.

6. The electrically driven device including the stepping motor according to claim 4, wherein one step is divided by "n" in micro-stepping, and a position of a count value that is multiple of "n" is set as the start point.

7. An electrically driven device including a stepping motor, comprising:

a moving unit arranged to move in accordance with a prescribed path;

a stepping motor arranged to generate a drive force for moving the moving unit;

a detecting unit arranged to detect that the moving unit has passed through a standard point by being driven by the stepping motor, the standard point and a target point being set on the path; and a control unit arranged to control rotation of the stepping motor by counting waveform steps of current of the stepping motor; wherein the control unit is arranged to cause the stepping motor to rotate such that the moving unit passes through the standard point, specify a count value of a stable stop point of the stepping motor that is closest to a count value at the point of time when the moving unit passes through the standard point, set the specified count value as a start point for controlling a rotation angle of the stepping motor, and execute a process of rotating the stepping motor and stopping the motor at the count value of the selected stable stop point so as to prevent displacement of the moving unit.

8. The electrically driven device including the stepping motor according to claim 7, wherein the stepping motor is a two-phase stepping motor.

9. The electrically driven device including the stepping motor according to claim 7, wherein the control unit divides micro-stepping by "n", and sets a position of a count value that is multiple of "n" as a start point.

10. The electrically driven device including the stepping motor according to claim 7, wherein the electrically driven device is a carriage of a flatbed scanner.

11. The electrically driven device including the stepping motor according to claim 10, wherein the carriage includes a full rate carriage and a half rate carriage, and a point that is closest to a count value at the time when the half rate carriage passes through the standard point is set as the start point.

* * * * *